US005785467A

United States Patent [19]

Gardner

[11] Patent Number: 5,785,467

[45] Date of Patent: Jul. 28, 1998

[54] LEVER BAR MACHINING APPARATUS

[76] Inventor: Dale W. Gardner, 12680 Herring Rd., Colorado Springs, Colo. 80908

[21] Appl. No.: 675,340

[22] Filed: Jul. 2, 1996

[51] Int. Cl.$^6$ ..... B23B 45/00

[52] U.S. Cl. ..... 408/87; 408/136; 408/236; 408/712

[58] Field of Search ..... 408/79, 87, 88, 408/95, 103, 108, 109, 110, 136, 234, 236, 237, 712; 173/36, 37

[56] References Cited

U.S. PATENT DOCUMENTS

| | | | |
|---|---|---|---|
| 595,896 | 12/1897 | Dusen et al. | 408/136 |
| 1,869,514 | 8/1932 | Seitz | 408/237 |
| 2,472,270 | 6/1949 | Stinchcomb | 408/76 |
| 2,625,063 | 1/1953 | Hanson | 408/95 |
| 2,709,380 | 5/1955 | Reynolds | 408/712 |
| 3,286,553 | 11/1966 | Spencer et al. | 408/79 |

FOREIGN PATENT DOCUMENTS

| | | | |
|---|---|---|---|
| 3017811 | 11/1981 | Germany | 408/236 |
| 91/04815 | 4/1991 | WIPO | 408/115 R |

*Primary Examiner*—Daniel W. Howell

[57] ABSTRACT

A multi-method capable portable machining apparatus including a lever bar and fulcrum that allows user to place multiplied pressure on the rotating cutting tool while at the same time controlling the torque and other reactional forces introduced by the operation. Provision is also made, in the work anchored fulcrum embodiment, so the operator can safely control break thru of the cutting tool by utilizing the compressive capability of the fulcrum in combination with a safety stop on the fulcrum. The design includes provision to apply multiplied pressure to the cutting tool using a fulcrum in either compression or tension mode. The device is light, compact, easily adjustable and multi-versatile to allow user ingenuity in method of application of the device to the situation at hand. One embodiment includes provision that allows safe, controlled operation without physically attaching fulcrum to the work.

6 Claims, 3 Drawing Sheets

LEVER BAR MACHINING APPARATUS

BACKGROUND

FIELD OF THE INVENTION

This invention relates to portable machining apparatus, specifically to equipment to more safely and effectively support, control and assist portable operations such as drilling, reaming, tapping, boring, trepanning, rotary sawing, etc.

DISCUSSION OF PRIOR ART

Widely used in industries such as construction, maintenance, manufacture and assembly are portable power tools including drill motors and similar equipment. These tools are powered by pneumatics, hydraulics or electricity and provide a convenient and efficient means of accomplishing many machining tasks. These tools are normally positioned, controlled and utilized directly by the workmans hands. Use of this type of tool results in injuries to thousands of workers each year. These injuries usually include broken, sprained, cut and abraided hands, wrists, arms and elbows.

A good deal of prior art teaches methods and equipment designed to assist in performing machining operations with portable drill motor support devices of the lever bar type. It would seem curious that even with the obviously great need for devices and methods that would facilitate safe support, control and operation of portable drill motors, and the extensive prior art in this field, that no lever bar devices that we know of are available for this use today.

The fact that thousands of related injuries occur each year make it clear that there is a real and urgent need for effective methods and equipment to assist such operations. There are several reasons for the rapidly escalating need for such equipment. A) Drill motors are increasingly numerous and powerful. B) Safety issues are of greater priority. C) Rising labor costs demand faster, more convenient methods and equipment. D) Medical costs for injuries are rising dramatically. E) Lost time for injuries is increasingly significant.

An examination of the prior art for portable drill motor support devices of the lever bar type, reveals why none that we are aware of are in use today. Reasons include issues such as not safe, too expensive, complicated, too large and unwieldy, not multi-versatile, too much set-up time required, too difficult to operate and control, not stable, etc. The emphasis of the prior art has been on methods of placing multiplied pressure on the cutting tool and little effort has been placed on an integrated design that would also allow full control of the reactional forces involved, thus increasing safety, multi-versatility, stability, convenience, and effectiveness.

U.S. Pat. No. 3,784,315 (1974) O'Brian—discloses a drill motor device that is high profile, thus necessitating a great deal of head room to operate. It also includes a fulcrum design that is not stable, works in a tension mode but is not capable of functioning in a compression mode and has little capability to assist in controlling the involved rotational forces. Also, it has no provision for control of tool break thru, which is a frequent reason for worker injury. U.S. Pat. No. 3,698,827 (1972) Salfer—discloses a drill motor attachment that is of lower profile but its fulcrum design is also not stable, works only in a tension mode and has no capability to assist in torque control. There is no provision to control break thru as tool exits workpiece.

U.S. Pat. No. 3,552,239 (1971)—R.L. Yeaman Et Al—discloses a portable drill press that requires high head room, whose fulcrum works only in a tension mode and because of its great length and design, provides little inherent capability to assist in torque control.

U.S. Pat. No. 2,709,380 (1944) J.Reynolds—discloses a drill motor attachment that is of lower profile but the design results in applying multiplied force tangentially to the tool axis. The fulcrum functions in tension only and provides no assistance for torque control. There is no provision to control tool break thru.

U.S. Pat. No. 3,834,828 (1974) Kikuchi—discloses a low profile drill holder but its fulcrums are designed to be used only in tension, are unstable, provide no assistance to control torque and have no provision to assist in controlling break thru.

Consequently there is a great and increasing need for methods and equipment that will allow an operator to more safely position and control portable tools with a high degree of efficiency, effectiveness, convenience and multi-versatility.

Objects and Advantages

Accordingly there are numerous objects and advantages of my invention. It will allow an operator a much higher degree of safety for drilling, boring, hole sawing and similar operations. It will increase the capacity of the work that can be achieved with hand held and controlled equipment. It will provide a means to allow increased production and convenience. It will reduce the incidence of injuries such as carple tunnel syndrome, sprained and broken wrists and hands, twisted elbows, cut and abraided limbs, etc. It will allow operators to safely produce holes in locations that presently are not reasonably possible by hand. It provides a multi-versatile design that allows great user inovation.

My invention will reduce the problems associated with the prior art such as not safe, not stable, large and awkward, complicated, expensive, too much set-up time required, impractical, not functional, etc. It is simple, inexpensive to manufacture, stable, readily adaptable to many conditions and situations, compact, low profile, light, easy to store and transport, user friendly, and will greatly improve production and reduce costs associated with worker injury.

The machining apparatus of the invention will allow an operator to place multiplied pressure between a cutting tool and a workpiece while at the same time maintaining control of the rotational and reactional forces produced by operation of the apparatus. To accomplish this, the apparatus includes provisions that assist the operator in preventing the apparatus from twisting out of control during regular operation as well as when the cutting tool breaks thru the workpiece. The design is such that the machining location can be close to the edge of the workpiece or a great distance, as required. Provision is made so that the lever bar can be forced towards or away from the workpiece to accomplish the machining operation, which allows for a setup to suit the job to be accomplished.

Further objects and advantages of my invention will become apparent from a consideration of the drawings and ensuing description of it.

LIST OF REFERENCE NUMERALS

Figure 1:
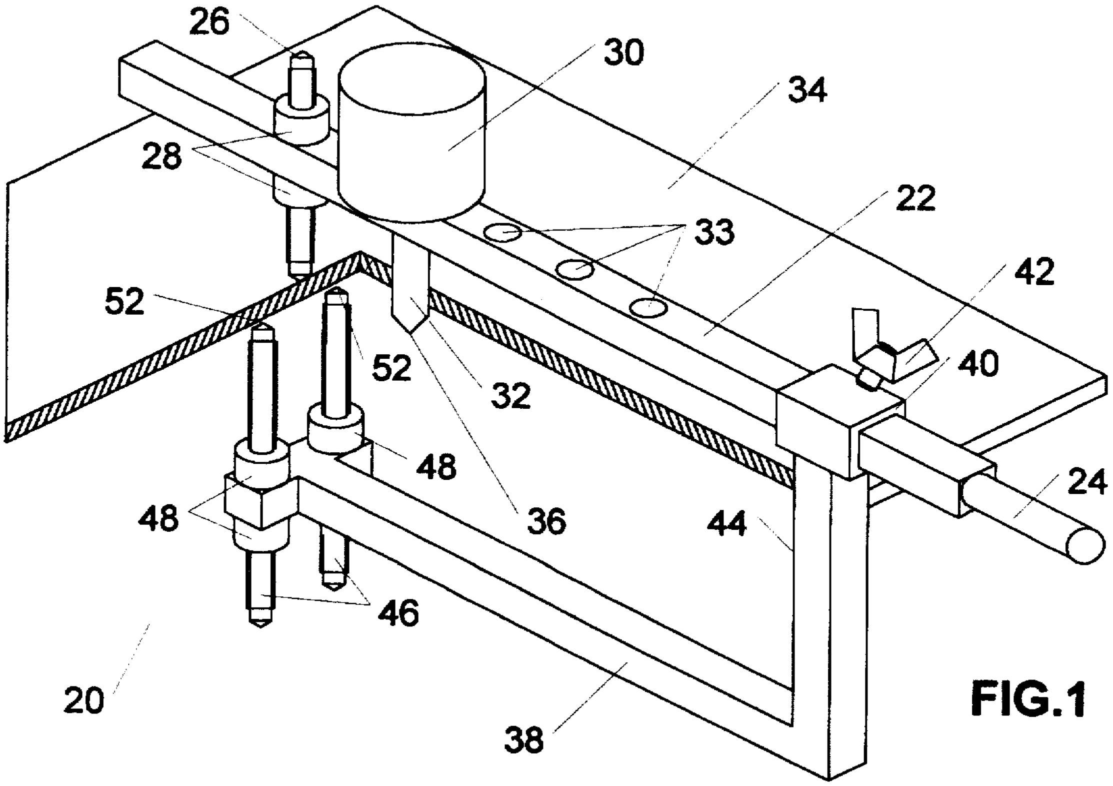
FIG. 1 is a perspective view of a fulcrum arm embodiment of my invention with the fulcrum positioned to require pushing lever handle towards workpiece for operation, which places the fulcrum under compression load.

20 machining apparatus assembly
22 lever bar
24 lever bar handle
26 lever bar safety stop
28 safety stop nut
30 drive mechanism
32 cutting tool
34 work piece
36 machining point
38 fulcrum arm
40 fulcrum arm sleeve
42 sleeve set screw
44 fulcrum arm throat
46 fulcrum rod
48 fulcrum rod positioning nut
50 fulcrum rod anchor nut
52 fulcrum point
54 fulcrum rod safety stop nut
56 brace leg
58 brace leg nut
60 support tower

DESCRIPTION OF INVENTION

All parts of the invention are made from steel or other suitably strong material.

FIG. 1 shows a perspective view of a fulcrum arm 38 embodiment of a machining apparatus assembly 20. A lever bar 22 is a tubular or bar-shaped member of adequate length and strength to apply the pressure multiplication and torque control required for the desired machining operation. A lever bar handle 24 is fastened to one end of lever bar 22 by welding, integral construction or other suitable method. Fastened to lever bar 22 by any appropriate means such as bolting or integral construction is a drive mechanism 30 which may be a drill motor or any similar hand or powered cutting tool drive mechanism. Connected to drive mechanism 30 is a cutting tool 32. A lever bar safety stop 26 is adjustably positioned thru holes or slots 33 in lever bar 22 with a safety stop nut 28, of which there are two. Lever bar safety stop 26 is a threaded rod-shaped member. A fulcrum arm 38 is made of tubular or bar-shaped material and is formed in the shape of an L. A fulcrum arm sleeve 40 is tubular in shape, and fastened to one end of fulcrum arm 38 by a suitable means such as welding or integral construction. A sleeve set screw 42 is located on fulcrum arm sleeve 40 and is used to clamp fulcrum arm 38 to lever bar 22. The other end of fulcrum arm 38 has a short tubular or bar-shaped member fastened to fulcrum arm 38 by bolting or welding or integral construction to support a fulcrum rod 46, of which there are two, adjustably secured in position thru holes with a fulcrum rod positioning nut 48, of which there are four. Fulcrum rods 46 have a rounded or cone shaped fulcrum point 52 formed on one end to contact a work piece 34.

Figure 2:
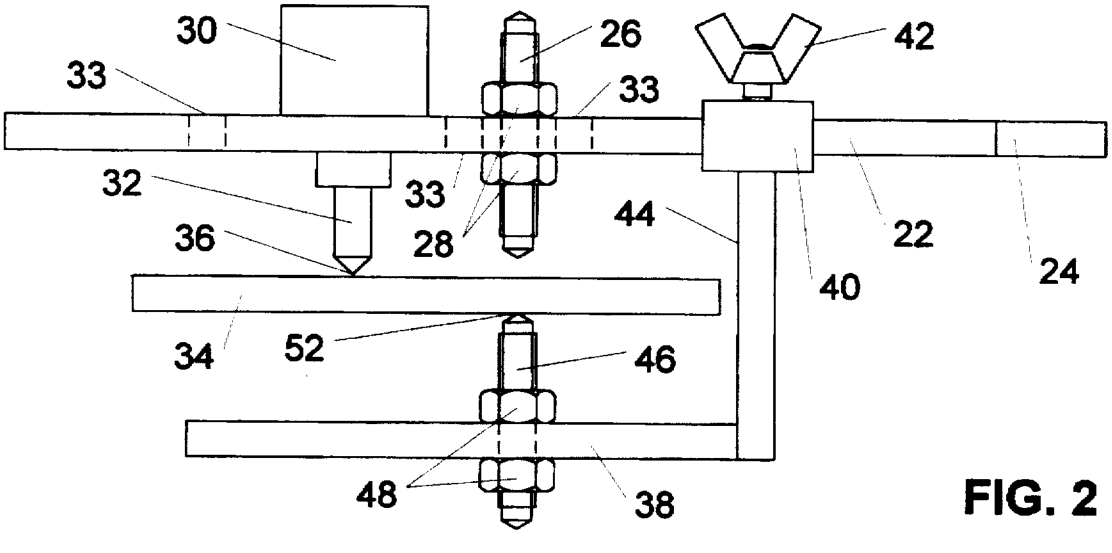
FIG. 2 is a side view with a fulcrum arm and a fulcrum positioned to require pulling the lever handle away from the workpiece for operation, which places the fulcrum under compression load.

FIG. 2 shows a side view of a fulcrum arm 38 embodiment of a machining apparatus. The components are identical to FIG. 1 with the exception that instead of two fulcrum rods 46, there is only one fulcrum rod 46 utilized.

Figure 3:
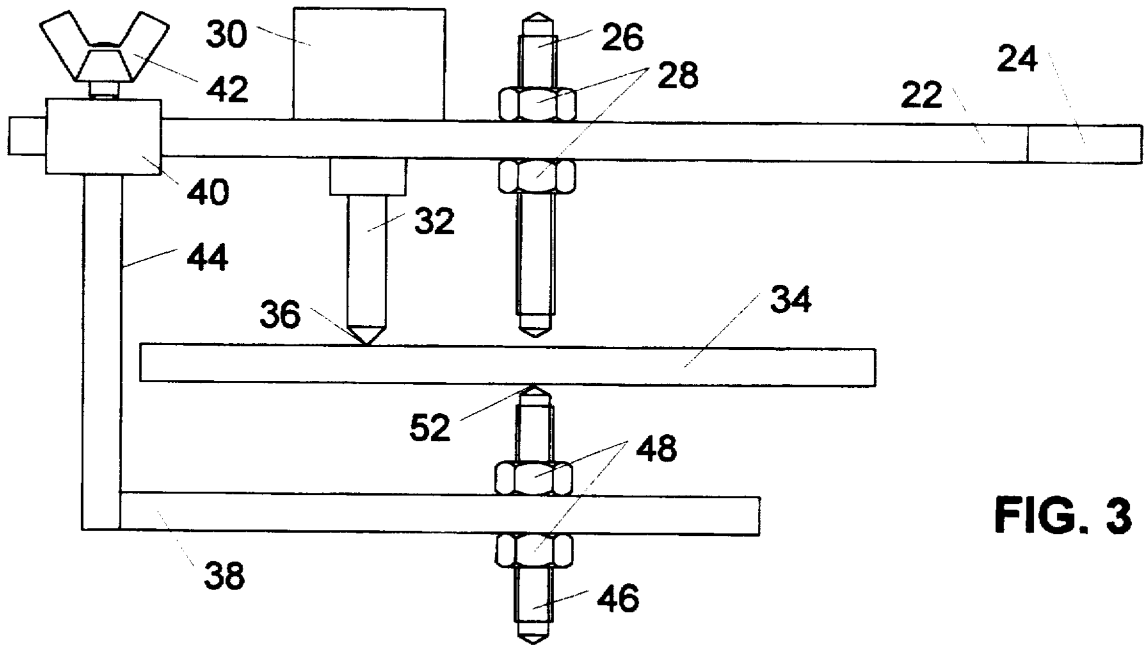
FIG. 3 is a side view of another embodiment with a fulcrum arm and a fulcrum positioned to require pulling lever handle away from work piece for operation, which places the fulcrum under compression load.
Figure 4:
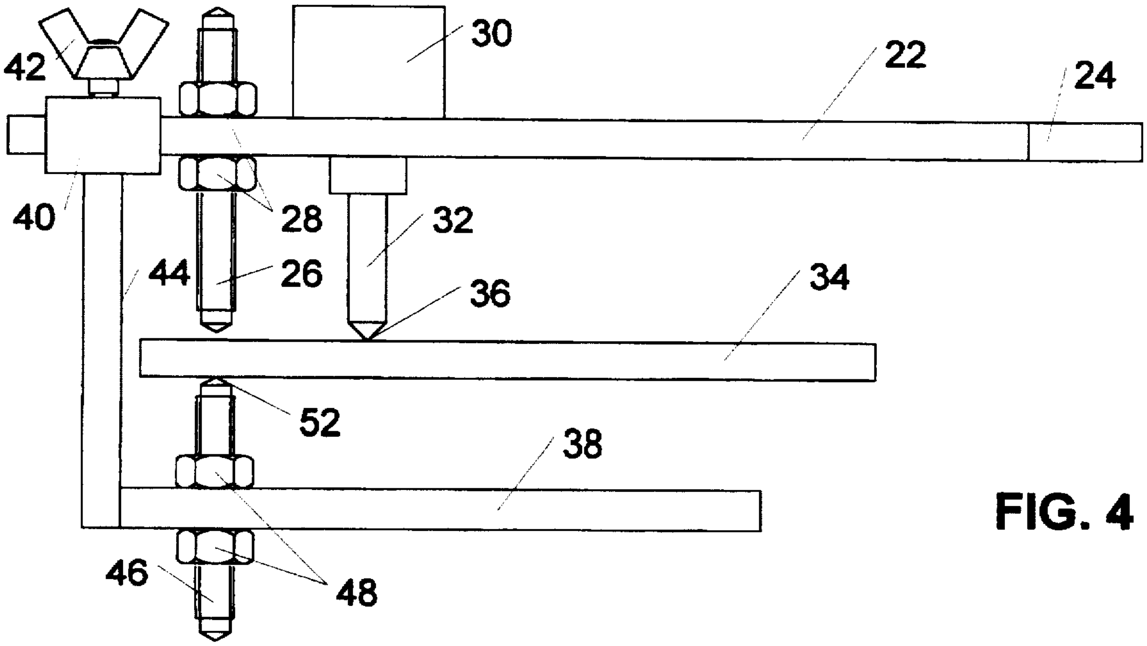
FIG. 4 is a side view of the embodiment shown in FIG. 3, but with a fulcrum arm and a fulcrum positioned to require pushing lever handle towards workpiece for operation, which places the fulcrum under compression load.

FIG. 3 & 4 show side views of a fulcrum arm 38 embodiment of a machining apparatus. The components are identical to FIG. 1 & 2 and as in FIG. 2 there is only one fulcrum rod 46 utilized.

Figure 5:
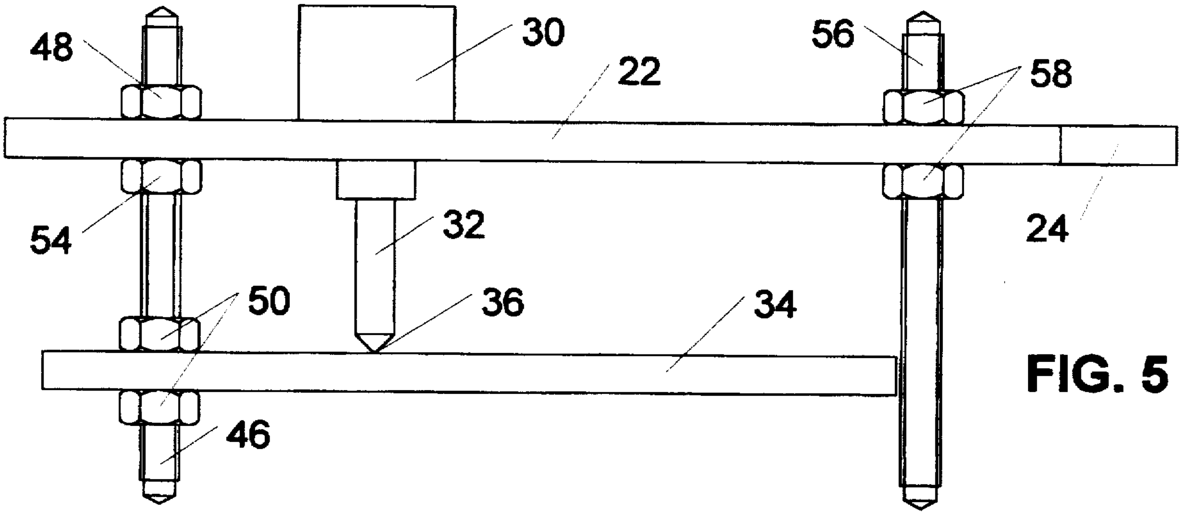
FIG. 5 is a side view of a work anchored fulcrum embodiment of my invention with fulcrum positioned to require pushing lever handle towards workpiece for operation, which places the fulcrum under tension load.
Figure 6:
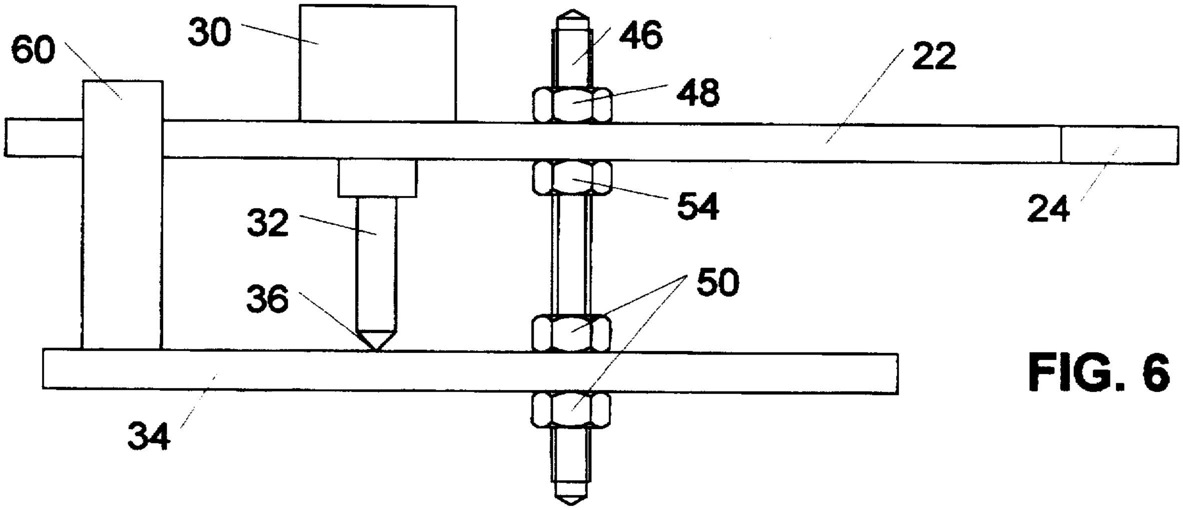
FIG. 6 is a side view of a work anchored fulcrum embodiment of my invention with fulcrum positioned to require pulling lever handle away from workpiece for operation, which places the fulcrum under tension load.

FIG. 5 & 6 show side views of an anchored fulcrum rod 46 embodiment of the apparatus. A lever bar 22 is a tubular or bar-shaped member of adequate length and strength to apply the pressure multiplication and torque control for the desired machining operation. A lever bar handle 24 is fastened to one end of lever bar 22 by welding, integral construction or other similar method. Fastened to lever bar 22 by any appropriate means such as bolting or integral construction is a drive mechanism 30 which may be a drill motor or any similar hand or powered cutting tool drive mechanism. Connected to drive mechanism 30 is a cutting tool 32. A fulcrum rod 46 is adjustably positioned thru holes or slots in lever bar 22 with a fulcrum rod positioning nut 48 and a fulcrum rod safety stop nut 54. Fulcrum rod 46 is a threaded rod of adequate size to forcibly resist the side load and the tensil and compressive loads encountered in operation. The other end of fulcrum rod 46 is positioned thru a hole in a work piece 34 and anchored in place with a fulcrum rod anchor nut 50, of which there are two. This connection may also be made by use of a threaded hole in work piece 34, by welding, or any other suitable means. FIG. 5 shows a brace leg 56, which is a threaded rod-shaped member, adjustably positioned thru holes or slots in lever bar 22. A brace leg nut 58, of which there are two, secures brace leg 56 to lever bar 22. FIG. 6 shows a support tower 60 which is a pressure-resisting structure that is bolted, clamped, welded or by any other suitable means is temporarily fastened to the work piece to forcibly resist the rotation of the apparatus under operation.

Operation of Invention

Following is an explanation of the operation of my lever bar machining apparatus assembly 20, whose purpose is to support a cutting tool 32 drive mechanism 30 while allowing operator to apply multiplied pressure between the cutting tool and the work piece as well as control the rotational and reactional forces produced by the operation.

FIG. 1—A lever bar 22 includes a lever bar handle 24 for the operator to grip, and a drive mechanism 30, securely fastened to lever bar 22. A cutting tool 32, such as a drill bit, hole saw, or similar type tool, is secured to drive mechanism 30. A long reach L-shaped fulcrum arm 38 with a fulcrum arm sleeve 40 and a sleeve set screw 42 is adjustably positioned and secured on lever bar handle 24 end of lever bar 22 to suit the job requirements. In the FIG. 1 embodiment, a fulcrum rod 46, both tension and compressive load capable and of which there are two, are adjustably positioned thru two holes at the other end of fulcrum arm 38. A fulcrum rod positioning nut 48, of which there are four, are used to adjustably secure fulcrum rods 46 to fulcrum arm 38.

Machining apparatus assembly 20 is positioned on a workpiece 34 such that cutting tool 32 is located at a machining point 36 which is at a greater or lesser distance from work piece 34 edge as desired, and on the side of workpiece 34 opposite of a fulcrum point 52, of which there are two. The adjustments allow the operator to position fulcrum points 52 relative to the desired machining point 36 to achieve the required pressure multiplication. The two fulcrum points 52 increase the stability of the machining operation as well as maintain perpendicularity of the cutting tool 32 axis with the workpiece 34 and thus increases safety and effectiveness of the apparatus. A lever bar safety stop 26 is adjustably positioned thru one of a plurality of holes or slots in lever bar 22, on the opposite side of work piece 34 from fulcrum points 52 and secured with a safety stop nut 28, of which there are two.

To operate the apparatus, with fulcrum points 52 positioned further from lever bar handle 24 than cutting tool 32, as set up in the FIG. 1 embodiment, the operator pushes lever bar 22 towards workpiece 34. This action, by utilizing the well known fulcrum and lever principle, places fulcrum rod 46 under compression load and causes multiplied pressure to be applied between cutting tool 32 and workpiece 34 to perform the desired machining operation. A fulcrum arm throat 44 may be positioned against the edge of workpiece 34 to provide for operator safety, by preventing the apparatus from twisting as it performs the machining operation. As cutting tool 32 breaks thru workpiece 34 the operator is able to control the break thru because lever bar safety stop 26 prevents the apparatus from falling against workpiece 34 as well as provides a second fulcrum point that allows the operator to pull lever bar 22 away from the workpiece 34 to control break thru.

FIG. 2—The only difference between the set up of FIG. 1 and FIG. 2 is that a fulcrum point 52 in FIG. 2 is positioned closer to lever bar handle 24 than cutting tool 32 is positioned. A lever bar safety stop 26 is positioned opposite of fulcrum point 52. As a result, for operation of the apparatus, the operator must now pull lever bar handle 24 away from a workpiece 34 to place multiplied pressure between cutting tool 32 and workpiece 34 to achieve the desired machining operation.

FIGS. 3 & 4 show very similar set ups to FIG. 1 & 2. However fulcrum arm 38 is placed on the opposite end of lever bar 22. This set up provision allows the operator to arrange the apparatus to suit the varying requirements of the jobs to be accomplished. As shown in FIG. 3, the fulcrum point 52 and cutting tool 32 relationship is such that the operator must pull lever bar handle 24 away from workpiece 34 for operation. In FIG. 4, the arrangement is such that lever bar handle 24 is pushed towards workpiece 34 for operation.

FIGS. 5 & 6—These embodiments use a work piece 34 anchored, and side force resistant, fulcrum rod 46 which is anchored with a fulcrum rod anchor nut 50 of which there are two. Fulcrum rod 46 may also be anchored to work piece 34 by welding, clamping, or other suitable means. The other end of fulcrum rod 46 is adjustably positioned thru holes or slots in lever bar 22 with a fulcrum rod positioning nut 48 on the upper side of lever bar 22, and a fulcrum rod safety stop nut 54 on the lower side. FIG. 5 set up requires operator to push lever bar 22 towards work piece 34, which places fulcrum rod 46 under tension, and FIG. 6 arrangement requires operator to pull lever bar 22 away from workpiece 34 for the machining operation, which also places fulcrum rod 46 under tension. Fulcrum rod 46 is of adequate size and strength to be both tension and compression load capable, as well as side load resistant for torque and reactive force resistance. Fulcrum rod safety stop nut 54 makes provision so that the operator can control cutting tool 32 break thru by reversing the force on lever bar 22, which places fulcrum rod 46 under compression load and allows the break thru to be controlled.

FIG. 5 shows a brace leg 56 which is adjustable positioned thru holes or slots in lever bar 22 and secured with brace leg nuts 58, such that it may assist operator in controlling torque and reactional forces by bracing it against the side of the workpiece or some other object.

FIG. 6 includes a support tower 60 which is bolted, welded, clamped or otherwise fastened to work piece 34 to provide a force resisting object to brace lever bar 22 or brace leg 56 against to control torque and reactive force produced by the operation.

SUMMARY, RAMIFICATIONS, AND SCOPE OF INVENTION

Accordingly, the reader will see that the lever bar machining apparatus of this invention is multi-versatile. This allows for great user ingenuity and motivation to successfully utilize the device for innumerable and difficult situations. The design and embodiments of the invention allow for a high level of control of the various forces generated in using the device, thus increasing safety for the user, as well as capacity of work that can be accomplished with portable machining equipment. Therefore, use of the device will increase production, capacity, capability and efficiency, while at the same time reduce worker injuries.

Although the description above contains many specificities, these should not be construed as limiting the scope of the invention but merely providing illustrations of some of the presently preferred embodiments of the invention. For example: A) The fulcrums may be of a design other than the threaded rods of the specification. B) The cutting tool drive mechanism could be connected to the lever bar with a swivel yoke, taught in prior art lever bar devices, to allow drill axis to pivot about lever bar axis for additional control of cutting tool axis to work relationship. C) The drive mechanism could also be integrally constructed with the lever bar if desired. D) The fulcrum rod positioning nut and fulcrum rod safety nut can be tied together with a yoke to allow simultaneous adjustment. E) The anchored fulcrum could include a pivot joint or joints if desired for the application. F) The L shaped fulcrum arm could include a pivot joint at the bend of the L, in combination with an adjustment means to allow operator to more easily change the location of the fulcrum point to the cutting tool.

Thus, the scope of the invention should be determined by the appended claims and their legal equivalents, rather than by the examples given.

I claim:

1. A portable machining apparatus for cutting a hole in a sheet workpiece, comprising a lever bar having an attached cutting tool drive mechanism and a handle, a fulcrum arm adjustably secured to said lever bar, said fulcrum arm having at least one fulcrum point about which said fulcrum arm pivots, said at least one fulcrum point being positioned on a surface of the workpiece such that pivoting said lever arm and said fulcrum arm about said at least one fulcrum point advances or retracts the cutting tool relative to the workpiece.

2. The portable machining apparatus of claim 1, wherein the cutting tool drive mechanism is located between the handle and the fulcrum point.

3. The portable machining apparatus of claim 1, wherein the fulcrum point is located between the handle and the cutting tool drive mechanism.

4. The portable machining apparatus of claim 1, further comprising a safety stop, wherein the lever bar has a plurality of holes or slots for locating the position of the safety stop opposite the position of the said at least one fulcrum point.

5. The portable machining apparatus of claim 4, wherein the fulcrum arm is L-shaped and has a set screw for securing the lever arm in a fixed position, such that the safety stop and fulcrum point may be retained equidistant from the lever bar handle as the safety stop is placed in different holes or slots in the lever bar.

6. The portable machining apparatus of claim 1, wherein two fulcrum points are provided on the fulcrum arm equidistant from the lever bar handle.

* * * * *